United States Patent [19]

Kahan

[11] Patent Number: 4,637,028
[45] Date of Patent: Jan. 13, 1987

[54] CONDUCTIVELY COOLED LASER ROD
[75] Inventor: Osher Kahan, Culver City, Calif.
[73] Assignee: Hughes Aircraft Company, Los Angeles, Calif.
[21] Appl. No.: 636,891
[22] Filed: Aug. 2, 1984
[51] Int. Cl.$^4$ .............................................. H09S 3/04
[52] U.S. Cl. ....................................... 372/34; 372/65; 372/98
[58] Field of Search .................... 372/34, 33, 35, 72, 372/92, 98, 65; 313/46

[56] References Cited

U.S. PATENT DOCUMENTS

| | | | |
|---|---|---|---|
| 3,599,113 | 8/1971 | Cremosnik | 372/72 |
| 4,096,450 | 6/1978 | Hill et al. | 372/72 |
| 4,429,394 | 1/1984 | Guch, Jr. | 372/34 |
| 4,506,369 | 3/1985 | Houston | 372/72 |

Primary Examiner—Leon Scott, Jr.
Attorney, Agent, or Firm—L. B. Sternfels; A. W. Karambelas

[57] ABSTRACT

An improved laser rod cooling system in which a laser rod (18) is cooled by conducting the heat generated thereby to a flexible, cushioning gel (21) which surrounds and contacts the rod along its length and secures the rod within a fully enclosing support (22). The support is thermally conductive and transparent to the pumping energy from a flashlamp (12). The gel material absorbs differential thermal expansion between the rod and its support to avoid any stresses otherwise exerted on the rod, while the complete surrounding of the rod by the support minimizes thermal gradients within the rod. Thus, a light beam with minimal optical distortion is generated by the laser rod.

18 Claims, 7 Drawing Figures

CONDUCTIVELY COOLED LASER ROD

BACKGROUND OF THE INVENTION

1. Field of the Invention

The present invention relates to lasers and, in particular, to a laser having an improved laser rod cooling arrangement.

2. Description of the Prior Art

A solid state laser rod, before it will emit electromagnetic radiation, must be excited by an outside source of energy. This source of energy emits visible or near visible radiation itself which is converted by the laser rod into a laser beam. Solid state laser rods generally are relatively inefficient and, therefore, convert only a relatively small portion of the energy absorbed by them into laser radiation, with much of the remaining energy being converted into heat. Because the efficiency of most solid state laser rods decreases with an increase in temperature, the additional heat generated by the laser's inefficient utilization of the outside source of energy exacerbates the inefficient operation of the laser. Thus, in order to counteract these heating and related inefficient operating problems, heat must be removed. A number of techniques have been utilized in the prior art to dissipate the generated heat. For example, if the heating is more than about 3 watts (about 35 watts of electrical power to the lamp), the rod can be cooled by flowing a fluid, such as a liquid or pressurized gas, over the rod. The fluid is recycled through a heat exchanger. Such a dynamic cooling system has various drawbacks. In the case of pressurized gas, a major problem is the high cost of sealing the circulating coolant gas while still permitting transmission of the light from the lamp. For liquid systems, the concern is the ultimate deterioration of the fluid upon exposure to the lamp, or pump light.

Because of these problems, other efforts relate to cooling the rod passively by thermal conduction. This technique is exemplified in U.S. Pat. No. 4,210,389 to Burkhart et al, in which the rod is cooled by depositing a reflective metallic layer on one side of the rod which is soldered to a heat sink. This technique has been found to grossly distort the optical quality of the rod for at least two major reasons. First, because the rod is rigidly held in a thermally conductive support and the two have different coefficients of thermal expansion, stresses are developed during pumping and cooling; the rod grows at a rate different from its support. This unequal expansion induces stress birefringence. Second, the rod is supported along its length on only a portion of its periphery, which creates a thermal gradient within the rod and a consequent nonuniform cooling. The result is an introduction of optical aberrations in the rod.

U.S. Pat. No. 4,181,900 to Tajnai et al also describes a conductively cooled pump cavity, in which the laser rod is strapped to a heat sink. The Tajnai et al system does not provide a satisfactory technique for cooling the laser rod since there is no thermal contact around the entire periphery of the rod. The result, like U.S. Pat. No. 4,210,389, is uneven rod cooling with induced thermal stresses. In addition, the straps themselves mechanically stress the rod.

Thus, what is desired is an improved technique for conductively cooling laser rods, which avoids the above stated disadvantages.

SUMMARY OF THE INVENTION

The present invention provides an improved technique for conductively cooling a laser rod positioned in a laser pump cavity. In particular, a thermally conductive support entirely surrounds the rod and a heat conducting flexible material between the rod and the support joins the two in complete thermal contact along substantially their entire lengths. Both the flexible material and the support are transparent to the light emitted by the cavity lamp. The transparent support is thermally coupled to a heat sink which may be part of a heat exchanging system. Pump light from the lamp is transmitted to the laser rod through the light-transparent, thermally conductive support and the flexible material, and the support and the flexible material carry away the heat generated in the rod.

In the preferred embodiment, the flexible material is a gel, such as a silicone gel. Because the gel exists in a semi-liquid state, any mechanical stresses caused by cooling of the rod are not transmitted to the rod or its support; rather the stresses causes the gel to expand freely and extrude from the open ends of the rod and the support. Thermal stresses are also minimized because the gel uniformly conducts heat away from the rod to the support, which, in turn, conducts the heat to the external heat sink. The external heat sink may be cooled by fins attached to it or by using a fluid to carry the heat to a more convenient heat exchanger.

The present invention thus provides a technique for conductively cooling the laser rod without incurring the disadvantages of the aforementioned prior art systems. In particular, the thermally conductive, flexible material essentially eliminates all mechanical stresses upon expansion of the rod. Further, since heat from the rod is uniformly transmitted to the flexible material and thence to a heat sink, thermally induced stresses on the laser rod are also minimized. Thus, the present invention substantially reduces stress-caused rod birefringence and otherwise enables the laser rod to generate a beam with minimal optical distortion and excellent collimation characteristics.

BRIEF DESCRIPTION OF THE DRAWINGS

For a better understanding of the invention as well as further features and objects thereof, reference is made to the following description which is to be read in conjunction with the accompanying drawings wherein.

The same reference numerals identify identical components in each of the figures.

DETAILED DESCRIPTION OF THE INVENTION

Figure 1:
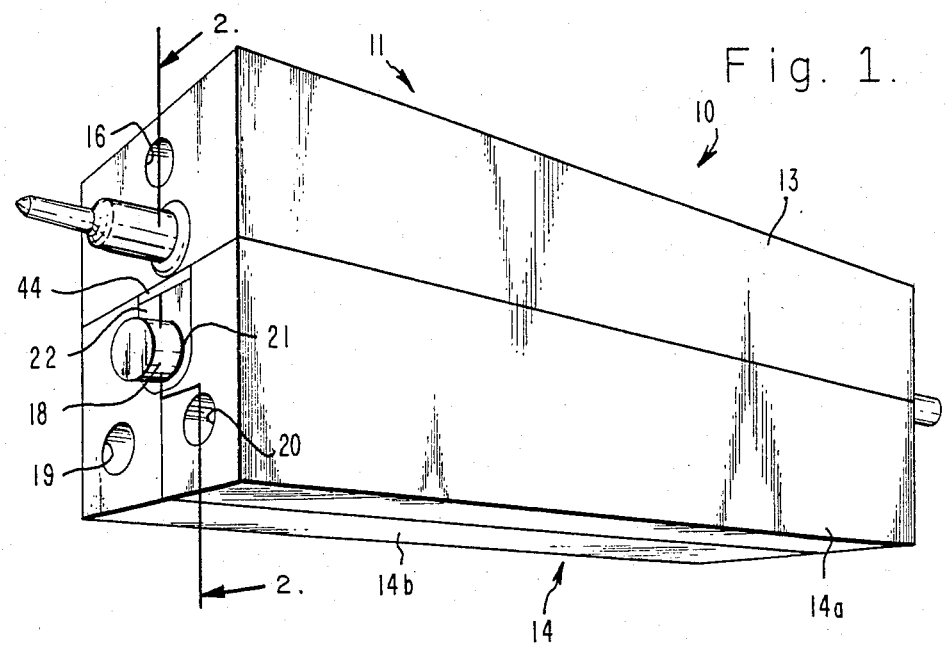
FIG. 1 is a perspective view of a laser pump head incorporating the teachings of the present invention.
Figure 2:
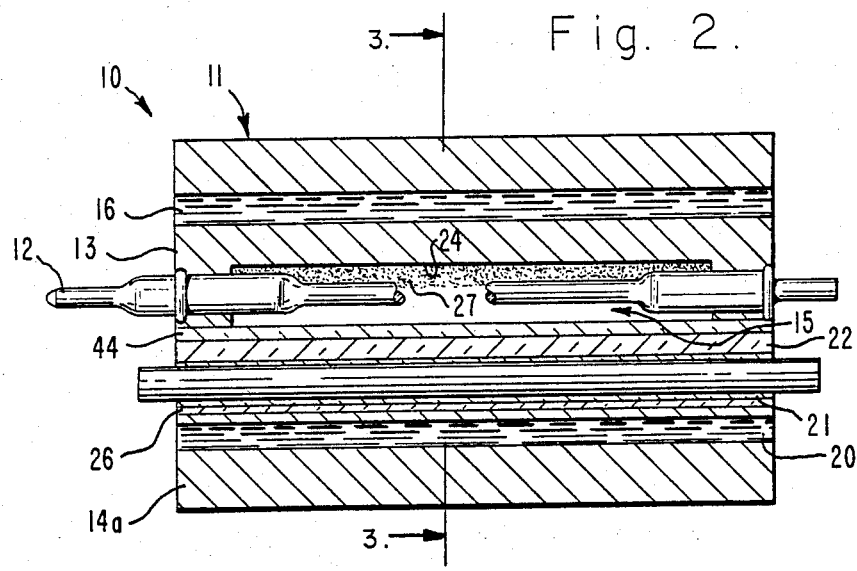
FIG. 2 is a sectional view taken along lines 2—2 of FIG. 1 showing the inside of the laser pump head.
Figure 3:
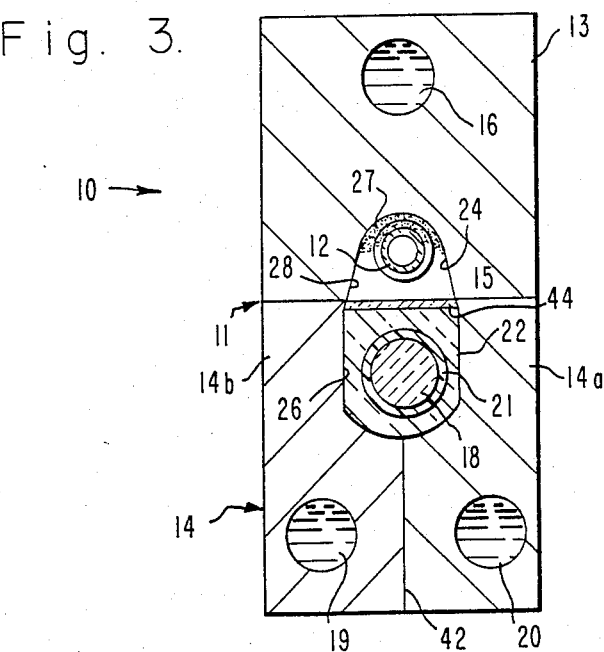
FIG. 3 is a cross-sectional view taken along lines 3—3 of FIG. 2.

Referring first to FIGS. 1-3, a laser pump head 10 includes a housing 11 which comprises separable portions 13 and 14, with portion 14 including a pair of sections 14a and 14b. Liquid coolant flow channels 16, 19 and 20 respectively extend through housing portion 13 and Sections 14a and 14b.

The housing portions have internal reflective surfaces 24 and 26, respectively, which form a laser pumping cavity or chamber 15. Cavity 15 may have any configuration suitable for laser operation, for example, surface 24 has an elliptical shape and lower surface 26 a generally square shape. Pumping chamber 15 and its housing are constructed of any material that can both provide a cavity structure for a laser and act as a heat sink, such as of a metal of good thermal conductivity, e.g., aluminum. Mounted within the lower portion of chamber 15 is a desired lasing structure including a laser rod 18. The rod may comprise laser crystal materials such as ruby, or Nd:YAG or a dye container.

A flashlamp 12 is disposed in lateral proximity to laser rod 18 so that the rod may be pumped to a lasing state. The mounting for laser rod 18 within chamber 15 includes a light transparent, heat conductive support 22, e.g., of sapphire, which extends along the length of the rod.

A cushion of flexible, heat conductive material 21 is positioned between the outside surface of rod 18 and the inner surface of support 22, and extends along the entire length of rod 18. As will be discussed in more detail hereinafter, laser rod 18 is open at its ends and material 21 is extrudable but has an elastic memory to allow it to move outwardly from and to be drawn back into support 22 at the ends of rod 18 during periods of differential thermal expansion and contraction between rod 18 and support 22.

The heat created by flashlamp 12 is removed from its immediate surrounding area by a packed powder 27 positioned between flashlamp 10 and the surface 24. Packed powder 27 may comprise any suitable material, such as BaSO₄, alumina, beryllia or a ceramic.

The packed powder has several characteristics. It has sufficiently high thermal conductivity to allow the heat developed by the flashlamp to be conducted from it to surface 24 and to a heat sink. It may also have properties of high diffuse reflectivity and ability to withstand ultraviolet light. It must also withstand the high temperatures created by the flashlamp. The particular details of using such a powdered material to cool flashlamp 12 is disclosed in U.S. Pat. No. 4,096,450 the details of which are incorporated herein.

Coolant flow channels 16, 19 and 20 act as heat exchangers to remove heat from the housing; however, other varieties of heat exchangers may be utilized.

An important aspect of the present invention is in the use of flexible, transparent material 21 which envelopes rod 18 along its entire length. The general characteristics of material 21 which make it particularly useful for laser rod cooling applications are (1) it provides a flexible or soft cushioned coupling between rod 18 and heat conductive support 22, (2) it transmits light from lamp 12 to rod 18, and (3) it conducts heat away from the rod.

Preferably, flexible material 21 comprises a semi-liquid gel type material, either a silicone, water or carbon gel. A silicone gel, resulting from mixing additives manufactured by Dow Corning Corporation, identified as Dow Corning 3-6527A and B, has been successfully utilized. The specific characteristics of the silicone gel, and other gel materials, which make it particurlarly useful in the present invention are that, when the two components are mixed, the product cures to form a cushioning, resilient gel-like mass. Such a gel is deformable, but has elastic memory characteristics, which permit it to act as a recoverable extrudate. The cured gel retains much of the stress relief characteristics of a liquid, i.e., it provides protection against mechanical stress caused by differential thermal expansion and contraction when used as an interface component, yet retains the dimensional stability and nonflow characteristics of a solid elastomer. Additionally, it forms a permanent adhesive bond with its contacting surfaces.

Specifically, the gel is positioned within a small gap formed between rod 18 and transparent heat conductive support 22. Its expansion characteristic causes it to expand faster than rod 18 or heat conductor 22; however, any stresses which might otherwise arise due to differential expansion or contraction of rod 18, support 22 and gel 21 are transmitted to the gel which is extruded out or drawn into the gap between rod 18 and its support at their open ends. Thus, the rod is not stressed. Only a minimal thickness of material 21 around rod 18 is needed, typically in the range from about 0.002 inches (0.05 mm) to about 0.005 inches (0.13 mm). Although the gel, in general, is a poor thermal conductor, its potentially insulative characteristics are avoided because the relatively small thickness of gel required results in only relatively small thermal gradients and, therefore, does not significantly impede the necessary heat transfer.

Sapphire is preferable as the material for support 22 since it is relatively inexpensive and has a high heat transfer coefficient. Alternate materials include glass, single crystal beryllium oxide, YAG and garnet. Obviously, the material selected should be transparent to the light emitted by lamp 10.

The method of forming the laser rod cooling assembly (not shown) comprising the rod 18, flexible material 21 and heat conductor 22, is to fill the hole of conductor 22 with the mixed additive components and to then insert rod 18. Spacing between 18 and 22 is maintained with shims. After the liquid becomes a gel, the shims are removed and the assembly is placed in housing portion 14. Mechanical pressure then holds thermally conductive support 22 and rod 18 in place within housing 14.

Support 22 is thermally connected to housing 14, which acts as a heat sink. It is made, for example, of aluminum, and the gold plating on the inner surfaces couples the pump light into rod 18. The aluminum heat sink portions 12, 14a and 14b are respectively cooled by coolant channels 16, 19 and 20.

For the sake of manufacturing convenience, support 22 is non-elliptical in shape, i.e., it has three flat surfaces and a single curved surface, although the overall shape could be varied. Since the gold layer reflects specularly, it is necessary that additional steps be taken so that the light from lamp 12 is efficiently directed to rod 18 through support 22. It has been determined that, if the surface of material 22 (sapphire, for example) is ground instead of polished, a diffuse surface is created which will cause more of the lamp light ultimately to strike rod 18 and increase the efficiency of the laser rod performance.

It has also been determined that, due to the relative matching of index of refraction between gel material 21 and the surface of rod 18, the normally diffuse surface of rod 18 would cause the perimeter of the rod to be loaded by the lamp light to a greater extent than the rod interior, thus causing the output laser beam to be divergent to an extent greater than desired. Since a highly collimated light output beam, which is generally required by laser users, requires more intense light at the center of rod 18, the surface of the rod is preferably polished in order to direct a greater portion of the light towards its center. It should be noted that the laser output beam can be manipulated by transmission through a telescope, for example, to provide a user with a desired beam divergence without being concerned with the finish characteristics of the rod surface.

The concept described hereinabove provides a means and method for uniformly cooling a laser rod with minimal thermal and consequential mechanical stress, so that the rod can produce an output beam with minimal optical distortion.

A cut 42 may be made in aluminum heat sink 14 to allow for good mechanical contact between support 22 and heat sink 14 by spring loading 14a and 14b. This provides good thermal contact. Further, in the case of a Nd:YAG$^{+3}$ laser rod, a samarium glass filter 44 (see FIG. 3) is inserted into cavity 15 to prevent depletion of the stored energy in rod 18 and to maximize the amount of laser light transmitted from the ends of laser rod 18.

Figure 4:
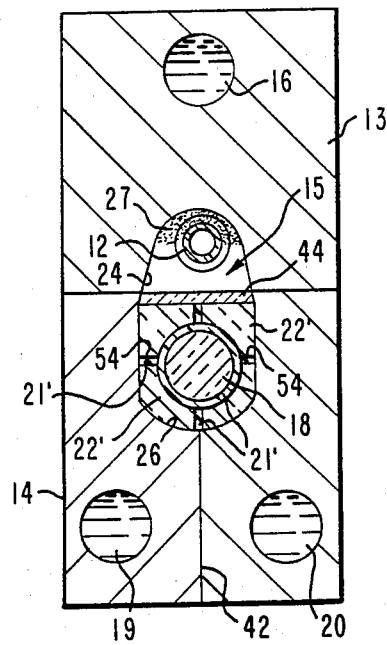
FIGS. 4-7 illustrate alternative embodiments for cooling the laser rod.

FIG. 4 illustrates an alternate configuration wherein the one-piece thermally conductive support of FIGS. 1-3 is segmented into a four-piece support 22' to facilitate assembly of rod 18 therewith and to permit a less resilient material than gel 21 to be used. Here, a spongy optical material 21'; such as Dow Corning 93-500 silicone rubber, is utilized as the flexible thermal material, which is placed not only about rod 18 but also in gaps or separations 54 between segments of support 22'. Since laser rod 18 expands about the same as thermally conductive support 22' while flexible material 21' expands about ten times as fast, but is not capable of expanding at the ends of the laser rod to the degree necessary, separations 54 are required in support 22' to accommodate for expansion of rubber 21'.

Although this embodiment also minimizes the thermal and mechanical stresses on laser rod 18 during laser operation, the segmentation of support 22' makes the laser structure of FIG. 4 more complex and expensive to fabricate.

If desired, a gap may be included in the embodiments of FIGS. 3 and 4 between the lower portion of thermally conductive support 22 or 22' and the adjacent inner surface of heat sink 14 to enable the upper portion of support 22 or 22' cool as rapidly as the lower portion.

Figure 5:
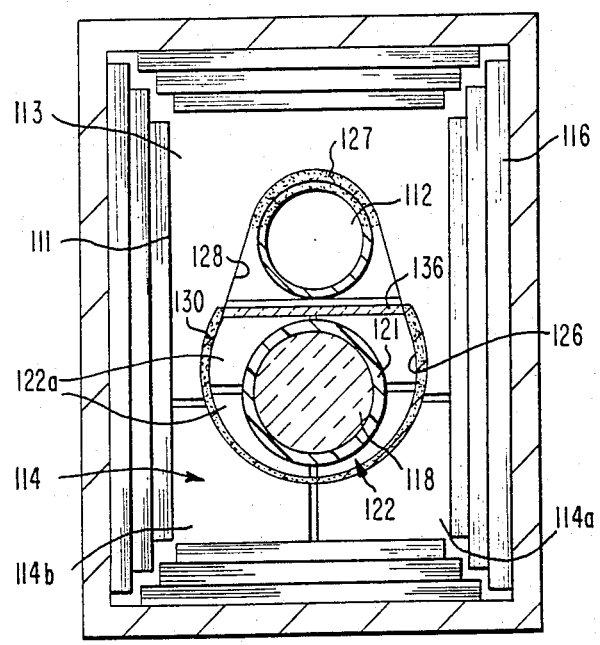

Referring now to the embodiment illustrated in FIG. 5, a housing 111 includes portions 113 and 114 which are surrounded by a heat exchanger 116. Like FIGS. 1-3, housing portion 114 comprises sections or segments 114a and 114b, and both portions 113 and 114 have elliptically-shaped inner surfaces 126 and 128. A support 122, of a material which is transparent to light from a flashlamp 112 and thermally conductive, has an outer surface for close fit of the support therein. Laser rod 118 is supported within support 122 by a flexible material 121. In this embodiment, material 121 comprises a commercially available silicone rubber which is in thermal contact with rod 118 and support 122. An additional layer of material 121 may be interposed between lamp 112 and rod 118. Support 122 is thermally coupled at its surfaces 126 to housing portions 113 and 114 by flexible material 130, which comprises an epoxy mixed with a reflective powder such as BaSO$_4$, MgO, etc. and has the properties of a heat conductor, and a light reflector. The embodiment shown in FIG. 5 accommodates differential expansion of the laser rod assembly to inhibit stressing of laser rod 118 in three ways, viz., by incorporation of flexible material 130, by provision of segments 122a in support 122 and by use of segments 114a and b in housing portion 114. Although the degree of expansion provided is maximized by utilizing all three features, the use of segments 122a or 114a and b alone is sufficient to provide good results.

When rod 118 is of Nd$^{+3}$YAG, a filter 136, preferably of samarium glass, is positioned between flashlamp 112 and rod 118, with Sm$_2$O$_3$ powder being added to material 130 to suppress the 1.06 micrometer wavelength generated by the laser along the laser sides. Material 130 thus provides two functions, to wit, its flexibility provides an additional technique for minimizing the stress on the laser rod, as previously described, and its reflectivity characteristics increase the pumping efficiency of lamp 112. If support 122 completely envelopes laser rod 118 with a substantially equal thickness, such as in the embodiments shown in FIGS. 3 and 4, uniform and circular isotherms are formed within the rod, indicating that the rod behaves like a high quality lens.

Figures 6, 7:
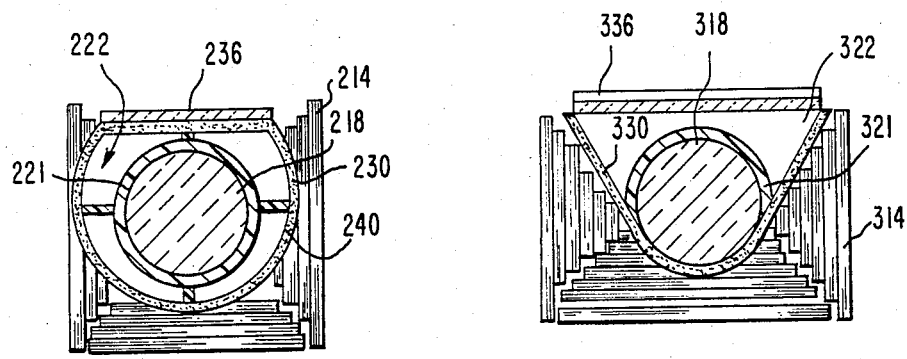

FIG. 6 illustrates another embodiment of the invention wherein a support 222 envelopes a rod 218 which in turn is surrounded by a housing 214. A layer of flexible transparent material 221, such as silicone rubber, is used as the cushioned coupling between rod 218 and support 222. A layer 230 of copper wool is interposed between support 222 and housing 214. The embodiment shown in FIG. 6 does not require any segments in housing 214 since support 222 comprises four segments and since copper wool designated by indicium 230 is placed between support 222 and housing 214. Copper wool 230 conducts heat from support 222 to housing 214 while allowing for differential thermal expansion. A layer of silver 240, formed with a protective aluminum overcoating of paint, is applied on the outer surface of support 222 to increase the pump efficiency by reflecting energy from the pump source to rod 218. Housing 214 may be cooled by an external heat exchanger of the type shown in FIGS. 3 or 5. A Sm glass filter 236, to suppress unwanted side radiation by laser rod 218, is provided as shown, if required.

A laser rod cooling embodiment which requires significantly smaller amounts of support material is shown in FIG. 7. In this embodiment, a support 322 is placed only on that side of a rod 318 facing the pump source. A layer 321 of silicone gel (silicone type rubber can also be utilized if segments are provided in support 322 is placed on one half of rod 318, the other half being directly thermally coupled to housing 314 by flexible material 330. The isotherms here will not be circular and the laser rod 318 will not function optically as well as in the other embodiments, but will be sufficiently useful for many applications since less support material 322 is used which, in the case of sapphire and beryllium oxide, results in a significant cost reduction. Because there is only one layer of flexible material 321 on one half of rod 318 overall, heat removal will be better than the embodiment shown in FIG. 6 where there are two gaps between laser rod 218 and housing 214. Laser rod 318 will thus remain somewhat cooler than in the other embodiments and is, therefore, useful at high pumping levels.

The determination, of which reflective method is to be used, depends on the gain cross-section desired in the laser rod. The specular reflection method described in FIG. 6, in addition to its reflection capability, allows for heat removal with the capability of further reducing laser rod stress using copper wool and thus is the preferred reflection material.

The present invention thus provides a technique for cooling the laser rod which significantly improves upon the prior art devices. By providing a flexible, thermally conductive cushion between the rod and the rigidly mounted support, the relatively poor optical beam characteristics caused by the thermal and mechanical stresses in the prior art devices are avoided. Further, the expansion characteristics of the laser rod and the support do not have to be matched to the thermal characteristics of the flexible cushion. Further, the flexible cushion is arranged to surround the rod along its entire length, thus avoiding optical aberrations which can be produced by nonuniform rod cooling.

An arrangement, in accordance with the principles of the present invention, has been successfully tested in the laboratory using Nd:YAG as the laser material, Dow Corning 3-6527A and B additives as the flexible cushion and sapphire as the intermediate support. Lasers using the conductively cooled flashlamp and rod assembly have been successfully operated at 250 watts input (8.2 joules at 30 hz) continuously for approximately 100 hours. Conductively cooled flashlamp and rod assemblies have been tested for over 1 million shots at 12.4 joule/shot and at 13 pulses/sec with no detrimental effects, the output laser beam having minimal birefringence or optical distortion.

While the invention has been described with reference to its preferred embodiments, it will be understood by those skilled in the art that various changes may be made and equivalents may be substituted for elements thereof without departing from the true spirit of the scope of the invention. In addition, many modifications may be made to adapt a particular situation or material to the teaching of the invention without departing from its essential teachings.

What is claimed is:

1. In a laser pump cavity having a source of laser pumping energy, a laser rod, a thermally conductive support therefor, and a cooling system for removing heat from the support, the improvement including a cushion thermally coupling said support to said laser rod and comprising a deformable elastic material which is capable of absorbing differential movements between said rod and said support in response to thermal changes therein, to minimize any mechanical and thermal stresses otherwise exerted on said laser rod.

2. The pump cavity of claim 1 further including means for enabling said cushion to move freely axially from and into the ends of said laser rod.

3. The pump cavity of claim 2 wherein said cushion comprises a gel.

4. The pump cavity of claim 1 wherein said support fully surrounds said rod and comprises a material which is transparent to the energy.

5. The pump cavity of claim 1 wherein said support is thermally coupled to heat sink means.

6. The pump cavity of claim 1 wherein said cushion is configured to conduct heat uniformly away from said laser rod.

7. The pump cavity of claim 1 wherein said laser rod has a polished surface.

8. In a laser pump cavity having a source of laser pumping energy, a laser rod, a thermally conductive support therefor, and a cooling system for removing heat from the support, the improvement including a cushion thermally coupling said support to said laser rod and comprising a silicone gel which is capable of absorbing differential movements between said rod and said support in response to thermal changes therein, to minimize any mechanical and thermal stresses otherwise exerted on said laser rod, and means for enabling said cushion to move freely at the ends of said laser rod.

9. In a laser pump cavity having a source of laser pumping energy, a laser rod, a thermally conductive support therefor, and a cooling system for removing heat from the support, the improvement wherein said support fully surrounds said rod and comprises a shaped sapphire material which is transparent to the energy including a cushion thermally coupling said support to said laser rod and comprising a material which is capable of absorbing differential movements between said rod and said support in response to thermal changes therein, to minimize any mechanical and thermal stresses otherwise exerted on said laser rod.

10. In a laser pump cavity having a source of laser pumping energy, a laser rod, a thermally conductive support therefor, and a cooling system for removing heat from the support, the improvement including a cushion thermally coupling said support to said laser rod and comprising a material which is capable of absorbing differential movements between said rod and said support in response to thermal changes therein, to minimize any mechanical and thermal stresses otherwise exerted on said laser rod, and wherein said support has surfaces adjacent to said rod an to said cooling system, and said surfaces are ground to diffuse and direct the energy efficiently to said rod.

11. In a laser pump cavity having a source of laser pumping energy, a laser rod, a thermally conductive support therefor, and a cooling system for removing heat from the support, the improvement including a cushion thermally coupling said support to said laser rod and comprising a material which is capable of absorbing differential movements between said rod and said support in response to thermal changes therein, to minimize any mechanical and thermal stresses otherwise exerted on said laser rod, and wherein said support is coupled to a heat sink, and said heat sink comprises a plurality of segments joined by material of said cushion to allow for any differential thermal expansion among said laser rod, said support and said heat sink.

12. In a laser pump cavity having a source of laser pumping energy, a laser rod, a thermally conductive support therefor, and a cooling system for removing heat from the support, the improvement including a cushion thermally coupling said support to said laser rod and comprising a material which is capable of absorbing differential movements between said rod and said support in response to thermal changes therein, to minimize any mechanical and thermal stresses otherwise exerted on said laser rod, and in which said support comprises a plurality of segments joined by material of said cushion to allow for any differential thermal expansion between said laser rod and said thermally conductive support.

13. The pump cavity of claim 12 wherein said cushion comprises silicone rubber.

14. In a laser pump cavity having a source of laser pumping energy, a laser rod, a thermally conductive support therefor, and a cooling system for removing heat from the support, the improvement including a cushion thermally coupling said support to said laser rod and comprising a material which is capable of absorbing differential movements between said rod and said support in response to thermal changes therein, to minimize any mechanical and thermal stresses otherwise exerted on said laser rod, and wherein said support is transparent to the energy generated by the source.

15. A method for cooling a laser rod in a pump cavity comprising the steps of:
    enclosing the laser rod in a thermally conductive support; and
    thermally coupling and cushioning said rod in said support with a thermally conductive, elastic material.

16. The method of claim 15 further comprising the steps of forming the support to be transparent to laser pumping energy, and fully enclosing the rod in the support.

17. A method for cooling a laser rod in a pump cavity comprising the steps of:
    enclosing the laser rod in a thermally conductive support; and
    thermally coupling and cushioning said rod in said support by placing a gel between the rod and the support.

18. A method for cooling a laser rod in a pump cavity comprising the steps of:
    enclsoing the laser rod in a thermally conductive support; and
    thermally coupling and cushioning said rod in said support by placing a silicone gel between the rod an the support.

* * * * *